(12) United States Patent
Kress et al.

(10) Patent No.: US 8,281,319 B2
(45) Date of Patent: Oct. 2, 2012

(54) METHOD AND APPARATUS FOR SEQUENCED MESSAGE PROCESSING BETWEEN AN EVENT HANDLER AND AN ADMINISTRATIVE OBJECT

(75) Inventors: Daryl J. Kress, Hugo, MN (US); Pauline C. Alfors, New Brighton, MN (US); Eugene J. Gretter, Lino Lakes, MN (US); Lowell D. Palecek, White Bear Township, MN (US); Thomas K. Austin, Hugo, MN (US)

(73) Assignee: Unisys Corporation, Blue Bell, PA (US)

( * ) Notice: Subject to any disclaimer, the term of this patent is extended or adjusted under 35 U.S.C. 154(b) by 1831 days.

(21) Appl. No.: 10/848,788

(22) Filed: May 19, 2004

(65) Prior Publication Data
US 2005/0262518 A1 Nov. 24, 2005

(51) Int. Cl.
*G06F 9/44* (2006.01)
*G06F 15/16* (2006.01)

(52) U.S. Cl. ........................................ 719/318; 709/228

(58) Field of Classification Search .................. None
See application file for complete search history.

(56) References Cited

U.S. PATENT DOCUMENTS

| | | | | |
|---|---|---|---|---|
| 5,535,389 A | * | 7/1996 | Elder et al. | 717/170 |
| 6,766,351 B1 | * | 7/2004 | Datla | 709/203 |
| 7,185,342 B1 | * | 2/2007 | Carrer et al. | 719/313 |
| 2001/0044827 A1 | * | 11/2001 | Zhuk | 709/205 |
| 2002/0032783 A1 | * | 3/2002 | Tuatini | 709/229 |
| 2002/0046283 A1 | * | 4/2002 | Gebauer | 709/228 |
| 2003/0097457 A1 | * | 5/2003 | Saran et al. | 709/230 |
| 2005/0108366 A1 | * | 5/2005 | Bodin et al. | 709/220 |

* cited by examiner

*Primary Examiner* — Andy Ho
*Assistant Examiner* — Abdou Seye
(74) *Attorney, Agent, or Firm* — Robert P. Marley; James E. Goepel

(57) ABSTRACT

An apparatus for and method of predefining a series of messages between a client application and a server application which needed to be transferred and honored in sequence to perform a compound service request. The sequence of messages is predefined through the use of an Action Control List, whereby the event handler defines the messages to the administrative object.

20 Claims, 18 Drawing Sheets

| | |
|---|---|
| InitDocument | Initially allocates a buffer of a given size for m_bstrDocument, but sets the length to zero. |
| AttachDocument | Attaches a BSTR to the CDACSMessage object. This enables the message to include an XML document. |
| CopyInDocument | Copies a provided BSTR to m_bstrDocument. Similar to operator = for CComBSTR. |
| AppendDocument | Appends a BSTR to m_bstrDocument. |
| DetachDocument | Detaches m_bstrDocument from the CDACSMessage object. |
| GetDocument | Returns m_bstrDocument. Similar to operator= for CComBSTR. |
| CopyOutDocument | Returns a copy of m_bstrDocument. |
| HasDocument | Returns TRUE if length of m_bstrDocument is not zero. Compare to operator ! for CComBSTR. |
| GetDocument-Length | Returns the length in characters of m_bstrDocument. |
| ReserveDocumentSpace | Allocates space for the document buffer. Makes multiple AppendDocument calls more efficient. |
| SetDocumentLength | Sets the length in characters of m_bstrDocument. |
| EmptyDocument | Frees m_bstrDocument. |

FIG. 2

| | |
|---|---|
| AttachToIterator | Initializes the given CDACSMsgPropIterator object to access the property map of this. |
| GetProperty | Gets a copy of the property value. Overloaded for integer, bool, CComBSTR, or CComVariant. |
| SetProperty | Sets the property value to a copy of the input. |
| GetPropertyCount | Returns the number of properties. |
| HasProperties | True if the message has at least one property. |
| ClearProperties | Deletes all the properties. |

FIG. 3

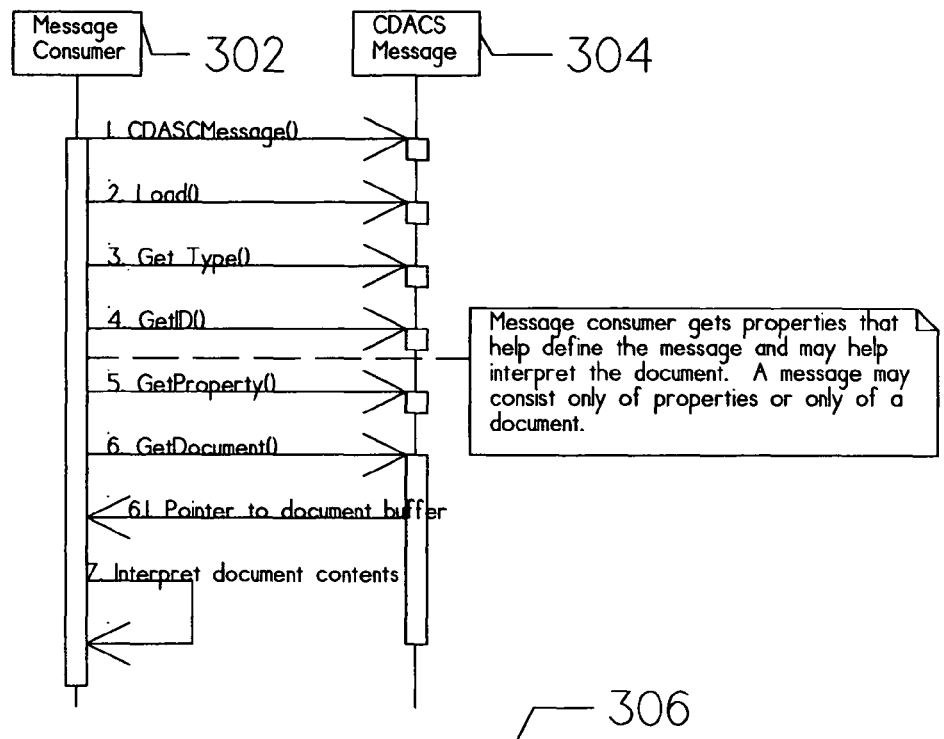

| Message # | Description |
|---|---|
| 1 | Document and property list initially empty. Initial message type and id will be overridden in the next step. |
| 2 | Copy data from the received VARIANT data to the CDACSMessage object. |
| 3 | Get the message type property. |
| 4 | Get the message id property. |
| 5 | Get a specific message property. Repeat as needed. Alternatively, the message consumer can retrieve all the properties in a loop. |
| 6 | Request a pointer to the document buffer. Alternatively, the message consumer could use DetachDocument to take responsibility for the buffer. |
| 6.1 | Returns a pointer to the document buffer. |
| 7 | Document is an optional attachment that contains message data in some format such as XML. Semantics are defined by the consumer. |

FIG. 5

- 🔒 DeleteAll()
- ◇ DeletePropertyPages()
- ◇ EnableToolbarButtons()
- ◇ <<static>>EnableToolbarButtonsByRole()
- ◇ <<Virtual>>GetBitmapIndex()
- ◇ GetChildCount()
- ◇ <<virtual>>GetCommType()
- ◇ <<Virtual>>GetCookie()
- ◇ <<Virtual>>GetDisplayName()
- ◇ GetLgBitMap()
- ◇ GetMyInstance()
- ◇ GetMyScopeItem()
- ◇ GetMyServer()
- ◇ <<Virtual>>getNodeType()
- ◇ <<Virtual>>GetParentScopeItem()
- ◇ <<Virtual>>GetResultViewType()
- ◇ GetSmBitMap()
- ◇ <<Virtual>>GetWatermarks()
- ◇ <<Virtual>>HasPropertySheet()
- ◇ <<Virtual>>InitializeActionList()
- ◇ InitializeCommandID()
- ◇ <<Virtual>>InvokePropertySheet()

FIG. 8BC

◇ DisplayError()
◇ ExpandNode()
◇ GetComm()
◇ GetDisplayInfo()
◇ GetHelpTopic()
◇ GetLinkedTopics()
◇ GetWatermarks()
◇ Initialize()
◇ InsertScopeItem()
◇ InterfaceSupportsErrorInfo()
◇ Notify()
◇ OpenComm()
◇ OpenToBISAdmin()
◇ OpenToMetaAdmin()
◇ OpenToSetCurrentComm()
◇ ProcessMsg()
◇ QueryDataObject()
◇ QueryPagesFor()
◇ SetPort()
◇ SetScopeItem()
◇ SetThisInstance()
◇ SetThisServer()
◇ TalkToServer()
◇ UpdateResultItems()

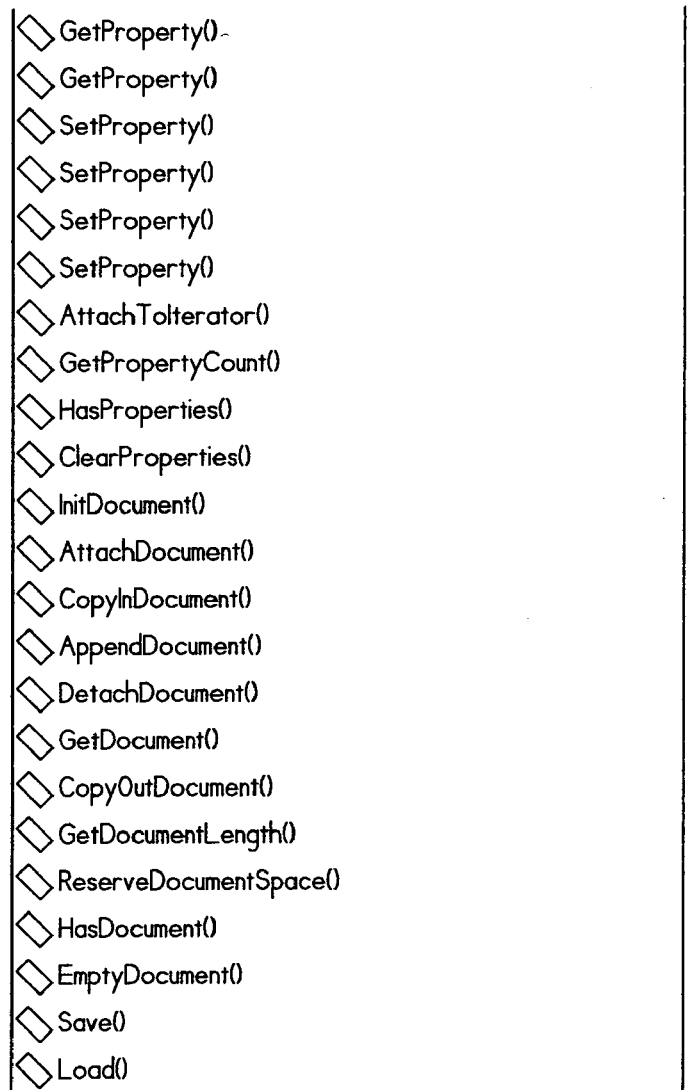
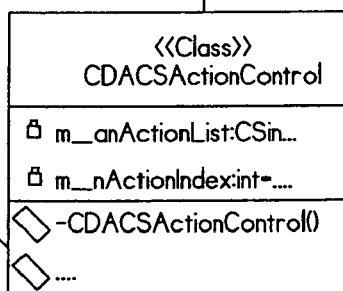
FIG. 8CB

- 🔒 《Virtual》LoadBitmap()
- ◇ NodeType()
- ◇ 《Virtual》OnAddImages()
- ◇ 《Virtual》OnAddMenuItems()
- ◇ 《Virtual》OnCreatePropertyPages()
- ◇ 《Virtual》OnDelete()
- ◇ 《Virtual》OnDeleteResult()
- ◇ 《Virtual》OnExpand()
- ◇ 《Virtual》OnMenuCommand()
- ◇ 《Virtual》OnMultiSelect()
- ◇ 《Virtual》OnPaste()
- ◇ 《Virtual》OnPropertyChange()
- ◇ 《Virtual》OnQueryPaste()
- ◇ 《Virtual》OnRefresh()
- ◇ 《Virtual》OnRename()
- ◇ 《Virtual》OnSelect()
- ◇ 《Virtual》OnSetToolbar()
- ◇ 《Virtual》OnShow()
- ◇ 《Virtual》OnShowContextHelp()
- ◇ 《Virtual》OnToolbarCommand()
- ◇ 《Virtual》OnViewChange()
- ◇ 《virtual》ProcessResponse()
- ◇ 《virtual》RemoveChild()
- ◇ RouteCommandMenuToChild()
- ◇ SetAdminRole
- ◇ SetCanUpdate()
- ◇ 《Virtual》SetMyScopeItem()
- ◇ 《Virtual》SetNextAction()
- ◇ SetParentScopeItem()
- 🔒 《static》UnloadBitmaps()
- ◇ UpdateDisplayName()
- ◇ UserDeleteMsg()
- ◇ VerifyMsgResponse()
- ◇ GetPPNextAction()

FIG. 8CC

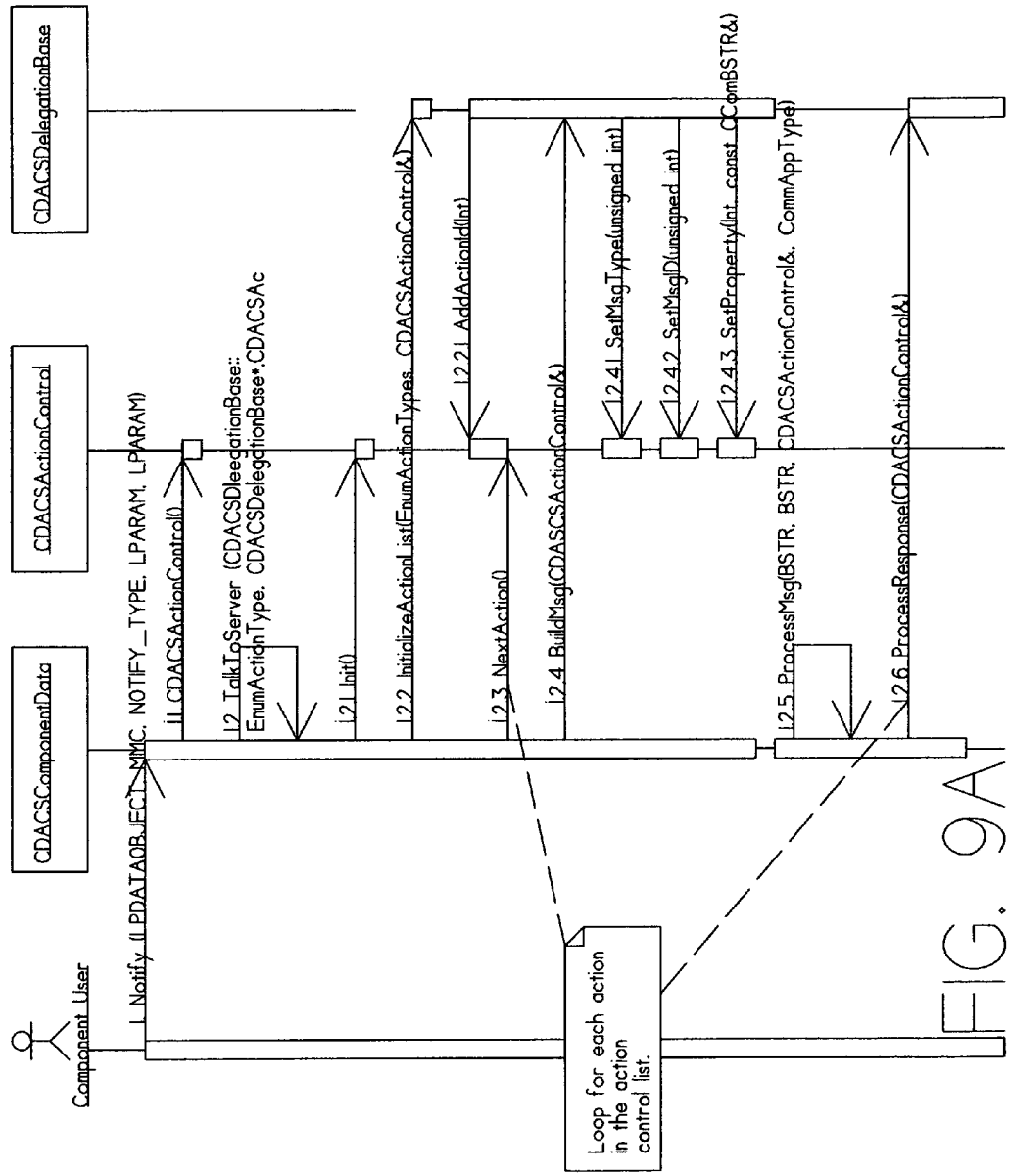

| Message # | Description |
|---|---|
| 1 | The client application user performs some UI action such as expanding a node in a tree view. |
| 1.1 | Construct a CDACSActionControl object. |
| 1.2 | The TalkToServer method is invoked for certain types of events. This manages communications with the server applications and coordinates the message interchange using the action control list. |
| 1.2.1 | Post construction initialization. |
| 1.2.2 | Request that a CDACSDelegationBase subclass (administrative object) initialize the messaging sequence relative to the action type. |
| 1.2.2.1 | Relative to the action type. one or more action ID's are added to the action control list. |
| 1.2.3 | Move to the first/next action in the action control list. |
| 1.2.4 | Request that the administrative object build a message for the current action in the action control list. |
| 1.2.4.1 | The action control list also serves as a message object. Set the message type to a request message (request information or perform operation on the server application). |
| 1.2.4.2 | Set the message ID that corresponds to the current action. |
| 1.2.4.3 | Call SetProperty as required to add content to the message needed by the server in order to perform the operation. |
| 1.2.5 | Perform the message interchange with the server application. sending out the request message. and receiving back a response message. |
| 1.2.6 | The action control list serving as a message object contains the response message sent back from the server. Call the administrative object ProcessResponse method to process the information in the message. This will invoke GetProperty and other messages methods to retrieve the server message content. |

FIG. 9B

METHOD AND APPARATUS FOR SEQUENCED MESSAGE PROCESSING BETWEEN AN EVENT HANDLER AND AN ADMINISTRATIVE OBJECT

CROSS REFERENCE TO CO-PENDING APPLICATIONS

U.S. patent application Ser. No. 10/848,902, filed May 19, 2004, and entitled, "Method and Apparatus for Combining Extended Markup Language and Key Value Pairs into the Format of an Interprocess Message Payload", now U.S. Pat. No. 7,587,719; U.S. patent application Ser. No. 10/848,473, filed May 19, 2004, and entitled, "Interface Cool ICE OLEDB Consumer Interface", now U.S. Pat. No. 7,217,971; U.S. patent application Ser. No. 09/188,629, filed Nov. 9, 1998, and entitled, "Cool ICE data Wizard", now U.S. Pat. No. 6,295,531; U.S. patent application Ser. No. 09/188,649, filed Nov. 9, 1998, and entitled, "Cool ICE Column Profiling", now U.S. Pat. No. 6,496,821; U.S. patent application Ser. No. 10/849,511, filed May 19, 2004, and entitled, "Stored Procedure", now U.S. Pat. No. 8,185,542; and U.S. patent application Ser. No. 09/188,725, filed Nov. 9, 1998, and entitled, "Cool ICE State Management", now U.S. Pat. No. 6,324,639, are commonly assigned co-pending applications.

BACKGROUND OF THE INVENTION

1. Field of the Invention

The present invention generally relates to diverse data base management systems and more particularly relates to enhanced message handling techniques which provide sequencing of multiple messages between client and server applications.

2. Description of the Prior Art

Data base management systems are well known in the data processing art. Such commercial systems have been in general use for more than 20 years. One of the most successful data base management systems is available from Unisys Corporation and is called the Classic MAPPER® data base management system. The Classic MAPPER system can be reviewed using the Classic MAPPER User's Guide which may be obtained from Unisys Corporation.

The Classic MAPPER system, which runs on proprietary hardware also available from Unisys Corporation, provides a way for clients to partition data bases into structures called filing cabinets and drawers, as a way to offer a more tangible format. The MAPPER data base manager utilizes various predefined high-level instructions whereby the data base user may manipulate the data base to generate human-readable data presentations called "reports". The user is permitted to prepare lists of the various predefined high-level instructions into data base manager programs called "MAPPER Script". Thus, users of the Classic MAPPER system may create, modify, and add to a given data base and also generate periodic and aperiodic reports using various MAPPER Script.

However, with the Classic MAPPER system, as well as with similar proprietary data base management systems, the user must interface with the data base using a terminal coupled directly to the proprietary system and must access and manipulate the data using the MAPPER Script command language of Classic MAPPER. Ordinarily, that means that the user must either be co-located with the hardware which hosts the data base management system or must be coupled to that hardware through dedicated telephone, satellite, or other data links. Furthermore, the user usually needs to be schooled in the command language of Classic MAPPER (or other proprietary data base management system) to be capable of generating MAPPER Script.

This communication tends to be "interactive" over a session which involves a number of separate and individual transactions. That means that a sequence of messages is transferred between client and server applications. This communication requirement is completely inconsistent with the protocol of publically accessible digital data communication networks, such as the Internet, and is particularly problematic when implementing an interface between otherwise incompatible legacy data base management systems. As a result, prior approaches have tended to force users to individually transfer each of the sequential messages required for a given session.

SUMMARY OF THE INVENTION

The present invention overcomes the disadvantages of the prior art by providing a method of and apparatus for simplifying sequential message traffic between client and server applications involving legacy data base management systems. This technique provides for individually transferring the required messages between client and server applications under control of an Action Control List.

The preferred mode of the present invention provides a generic messaging protocol that can be used by client/server applications. The properties can be transmitted in different data types such as integer, boolean, BSTR, and VARIANT. The message object also provides the capability to transmit XML, as either a document included in the message, or as XML contained in individual properties. An object API (Applications Programming Interface) is provided to set and retrieve message properties and document information.

The object API also provides the capability for the message to render itself into a byte stream for transmission across a communications protocol, as well as the ability to reconstitute state from a byte stream received.

The protocol consists of two primary classes used by the consumer application: the CDACSMesage class and the CDACSMsgPropIterator class. The CDACSMessage class provides the primary interface to the message processing with the ability to construct, set and get attributes, or read/write out message content. The CDACSMsgPropIterator class provides an iterator object interface to move through a sequence of properties in the message, so that the keys and value of message properties can be accessed. The message body is a set of CComVariant properties, and a CComBSTR buffer. The CDACSMessage class provides methods for the consumer to manage the properties and document buffer.

A BSTR is a pointer to a buffer of Unicode characters. The length of the buffer is offset four bytes before the characters begin. The entire buffer is null-terminated, but there can also be null characters embedded in the buffer. The length of the BSTR is one less than the number of characters in the buffer (the buffer includes a final null character), not the length to the first null, in reality, a Unicode "character" is type defined as an unsigned short integer, so a BSTR can point to generic binary information as well as text.

A BSTR can be utilized as though it were a simple pointer to WCHAR, except for finding length or managing the attached buffer to which it points. For memory management, the Windows libraries provide "system" procedures (SysAllocString, SysFreeString, SysStringLen, etc.), which are packaged conveniently into the CComBSTR class methods.

To the CDACSMessage consumer, the properties and the attached document buffer constitute the message data. A message need not have both properties and document. It can consist entirely of properties with no document, or have no properties and consist solely of the attached document.

Properties are indexed by unique integer keys. The consumers define meaning of these keys and the associated CComVariant values. As noted above, the contents of the document can be non-textual binary data.

The preferred embodiment of the present invention provides an Action Control List object that defines message sequencing and encapsulates the message content that can be exchanged between an event handler and an administrative object. The Action Control List provides a lightweight object to process a series of messages, maintaining state relative to the current action.

To efficiently sequence the series of messages, the communication is decoupled from the event processing using the Action Control List. This allows the event handler to perform communications with the server application that are independent of administrative object event processing. For example, the need for the client and server applications to initialize requires messaging independent of any specific administrative operation.

Another aspect is that the Action Control List is in effect a message object itself, extended by the concept of a control list. The action control list derives from a message object, and the message contains the request or response information pertaining to the current action in the list. Hence the administrative object can directly access the request/response information pertaining to the current action in the list.

Using the command class model requires that a series of concrete command subclasses be constructed that are tightly bound to each administrative object that requires communications in response to an event. The advantage of using the Action Control List is that it provides a lightweight class that is not tightly coupled to the administrative object. Administrative objects encapsulate the action processing and message content relative to the specific event. The Action Control List provides a single class to use for message sequencing and exchange. This allows for better maintainability in terms of administrative object event handling, because the model requires fewer classes be built in order to handle events.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 2 is a table showing the methods for managing the message body;

FIG. 3 is a table showing the method of managing the property list in the CDACSMessage class;

FIG. 5 is a detailed sequence diagram showing how a message consumer application utilizes the object model to retrieve information;

FIG. 9 is a schematic diagram showing Action Control List message processing along with a list of the associated messages.

DETAILED DESCRIPTION OF THE PREFERRED EMBODIMENTS

The present invention is described in accordance with several preferred embodiments which are to be viewed as illustrative without being limiting. These several preferred embodiments are based upon Series 2200 hardware and operating systems, the Classic MAPPER data base management system, and the BIS software components, all available from Unisys Corporation. When used herein, OLEDB refers to a COM-based Application Programming Interface (API) designed to provide access to a wide range of data sources. OLEDB includes SQL functionality but also defines interfaces suitable for gaining access to data other than SQL data. COM facilitates application integration by defining a set of standard interfaces. Each interface contains a set of functions that define a contract between the object implementing the interface and the client using it. A UDL file contains the complete connection string information, including the data source, userid, password, and any other information needed to logon to and fetch data.

Figure 1:
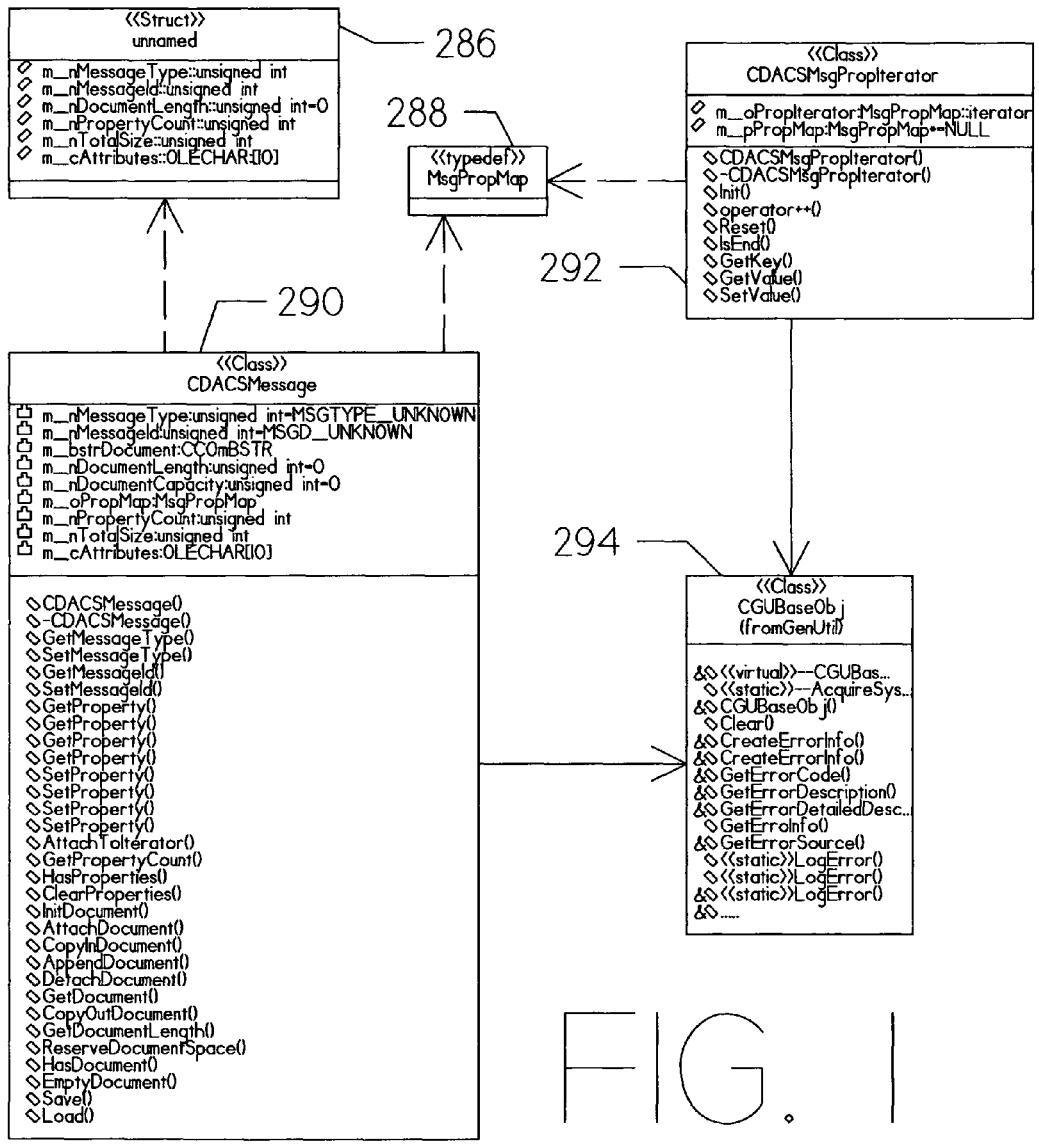
FIG. 1 is a detailed class diagram showing class definitions for the messaging protocol.

FIG. 1 is a detailed class diagram that describes the class definitions. Using the object model in the class diagram, a consumer application can send a message to a peer application. Element 290 defines the CDACSMessge class. The integer variables are in turn encapsulated by element 286. CDACSMsgPropIterators are defined in element 292, which like element 290, uses the message map of element 288. The error handling object format is shown at element 294.

FIG. 2 is a detailed table showing the methods for managing the message body. In the preferred mode of the present invention, the CDACSMessage class provides methods for managing the message document similar to the CComBSTR methods for managing the attached BSTR. Some of the CDACSMessage methods have similar names and actions as CComBSTR counterparts, except that they apply to the m_bstrDocument member rather than m_str.

In accordance with the table of FIG. 1, the leftmost column lists the basic functions. The corresponding entry within the rightmost column defines the operation associated therewith.

The CDACSMessage class does not provide methods corresponding to the CComBSTR methods ReadFromStream and WriteFromStream, to write the document to an IStream. Instead, it provides the Save and Load methods for converting between the entire object and a simple memory buffer. Furthermore, the CDACSMessage class does not provide methods corresponding to the CComBSTR method LoadString for loading a string from a resource.

FIG. 3 is a detailed table showing the methods utilized by CDACSMessage class to manage the property list. The leftmost column provides a listing of the defined operations. The rightmost column offers a complete definition corresponding to each of these operations.

Figure 4:
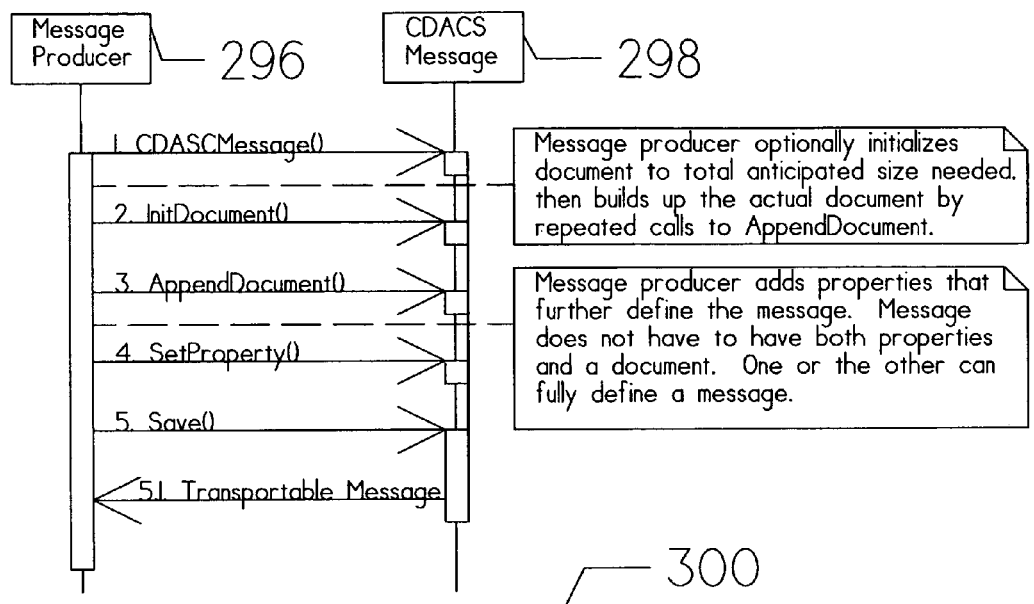
FIG. 4 is a detailed sequence diagram showing use of the objects to build up the message by a message producer.

FIG. 4 is a detailed sequence diagram showing use of the objects to build up the CDACSMessage by a message producer in order to convey a message payload to another application. Each of the preliminary messages 1-5 is sequentially initiated by Message Producer 290 as shown. Table 300 provides a detailed description corresponding to each of these preliminary messages. The information is integrated at CDACSMessage 298 into the transportable message 5.1, which is more fully defined in table 300.

FIG. 5 is a detailed sequence diagram showing how a message consumer application uses the object model to retrieve the enclosed information. Internal messages 1-6 are sent from Message Consumer 302 to CDACSMessage 304 as shown. Each of these is defined in detail in table 306. Internal message 6.1 provides the unpacked data to Message Consumer 302. Internal message 7 actually shows use of the unpacked data by Message Consumer 302 as defined in table 306.

Figure 6:
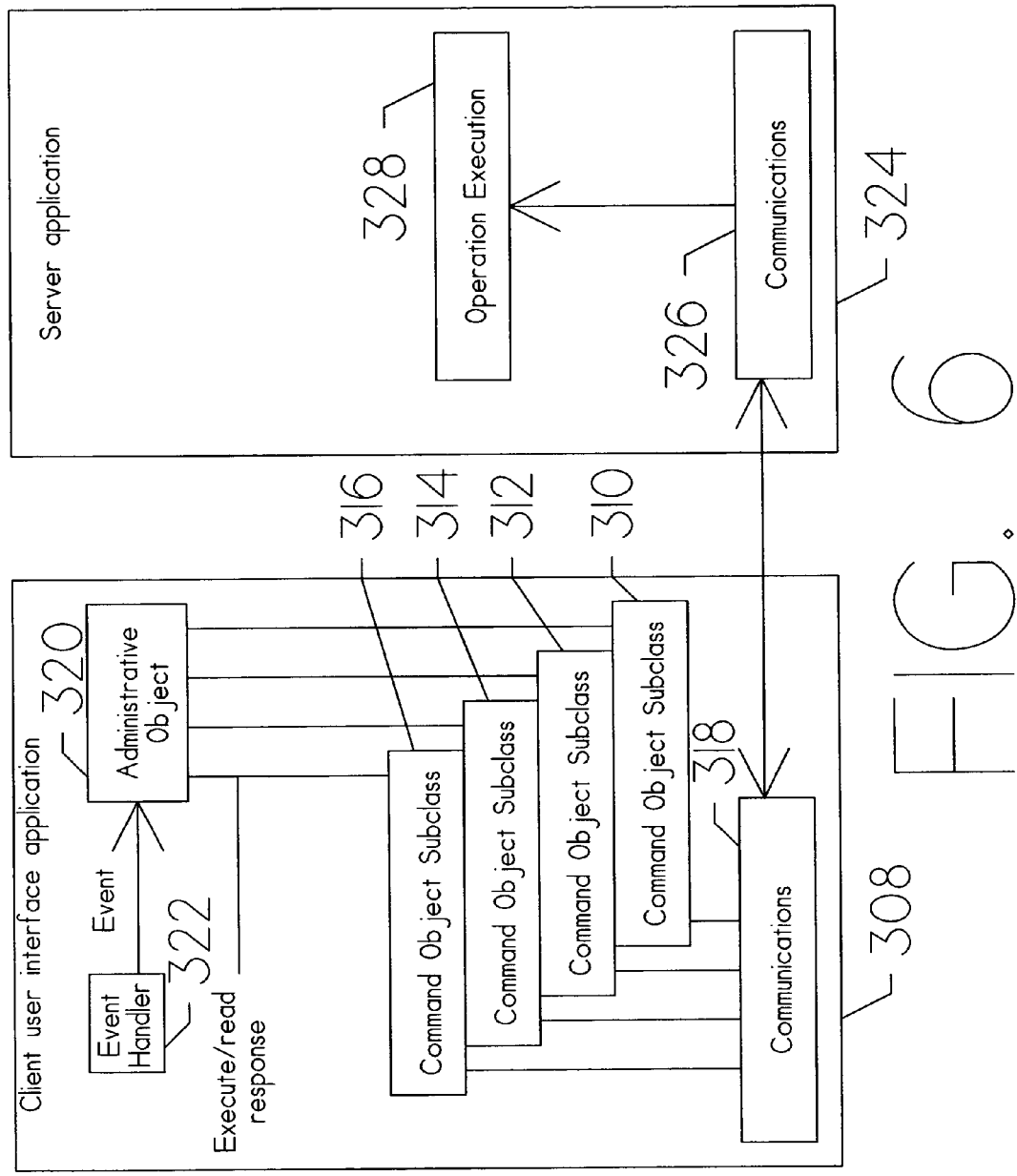
FIG. 6 is a schematic diagram showing command based message processing.

FIG. 6 is a schematic diagram showing the command based message processing. In this example, a client application, shown as Client user interface application 308, interacts with server application 324 to accomplish a particular task. The actual communications occur between communications 318 and communications 326. Server application 324 performs the requested operations via function of operation execution 328.

The operation of client user interface application 308 is provided by event handler 322. It notifies administrative object 320 as shown. In response thereto, administrative object 320 calls command object subclasses 316, 314, 312, and 310 in that sequence. Each of these command object subclasses sequentially requests service from server application 324 via communication 308. To perform the desired compound function, services must be sequentially requested from server application 324 in the order shown.

Figure 7:
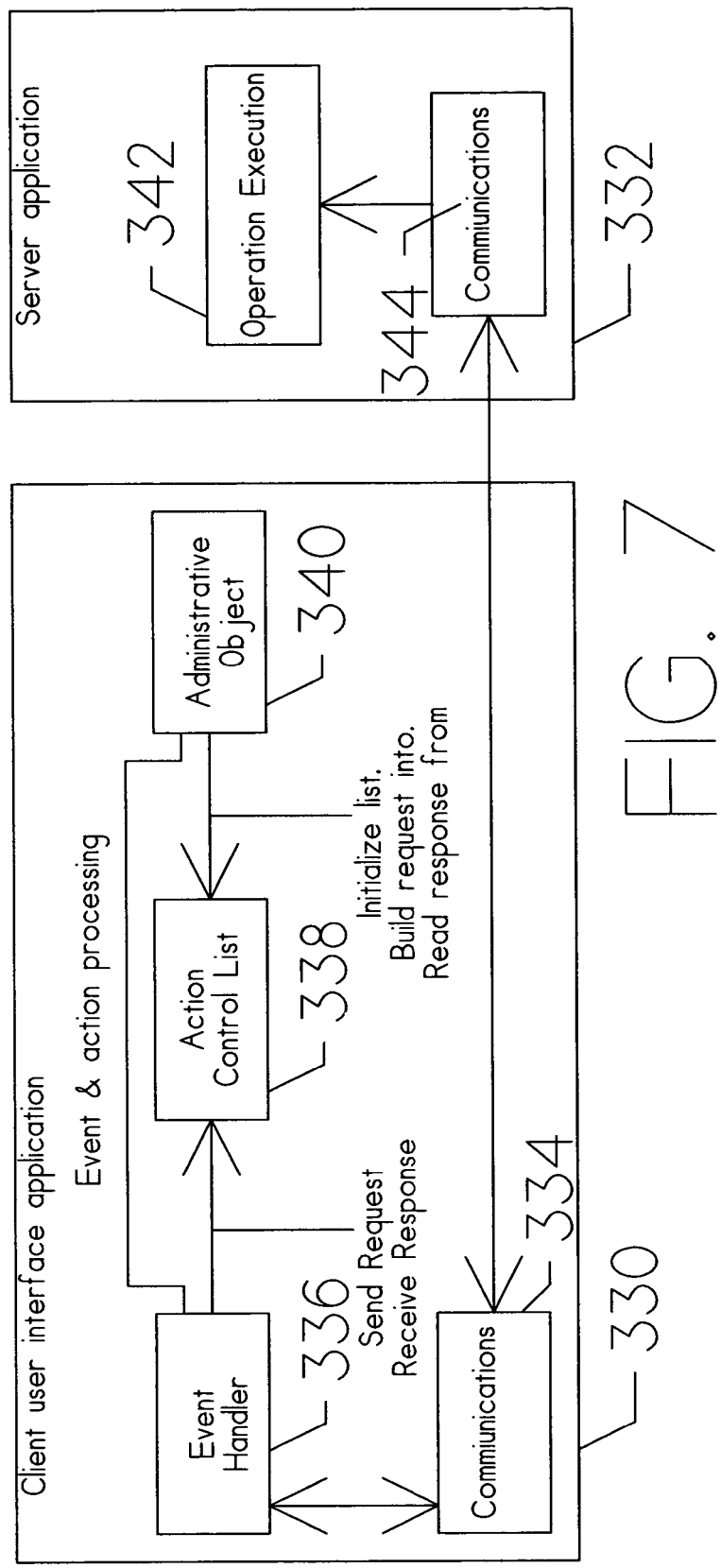
FIG. 7 is a schematic diagram showing the operation of FIG. 13 along with the Action Control List.

FIG. 7 is a schematic drawing of the same operations of FIG. 6 performed under control of the Action Control List of the preferred mode of the present invention. Communication between client user interface application 330 and server application 332 is provided by communications 332 and 334. The requested services are performed by server application 332 in operation execution 342.

However, in this preferred embodiment, event handler 336 and administrative object 340 are linked by Action Control List 338. All of the required messages are defined by Action Control List 338 in the needed sequence. As a result, Action Control List 338 only needs to be initialized for a given compound service and thereafter, each of the required messages is defined in order.

Figure 8:
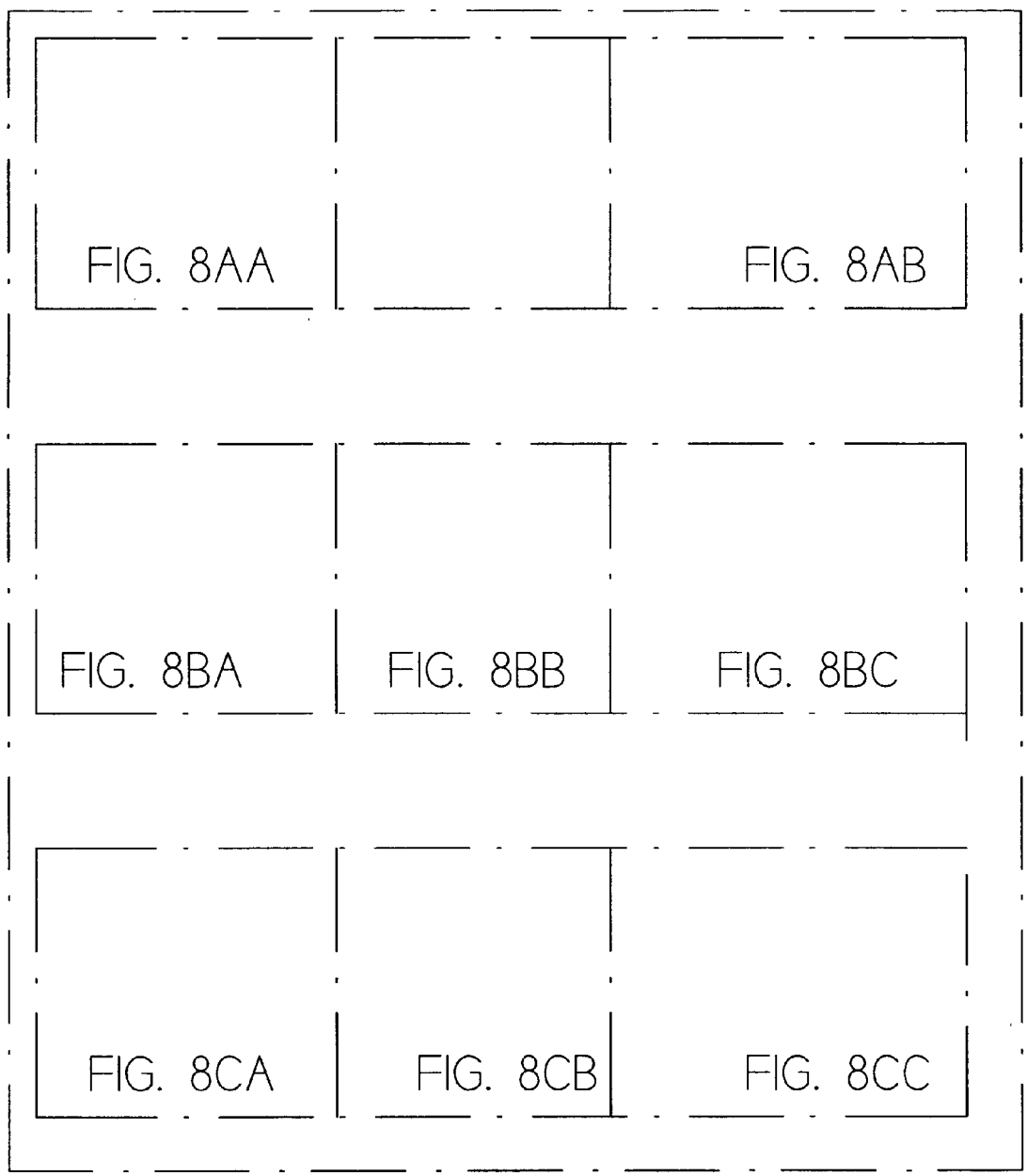
FIG. 8 is the Action Control List class diagram.
Figure 8A:
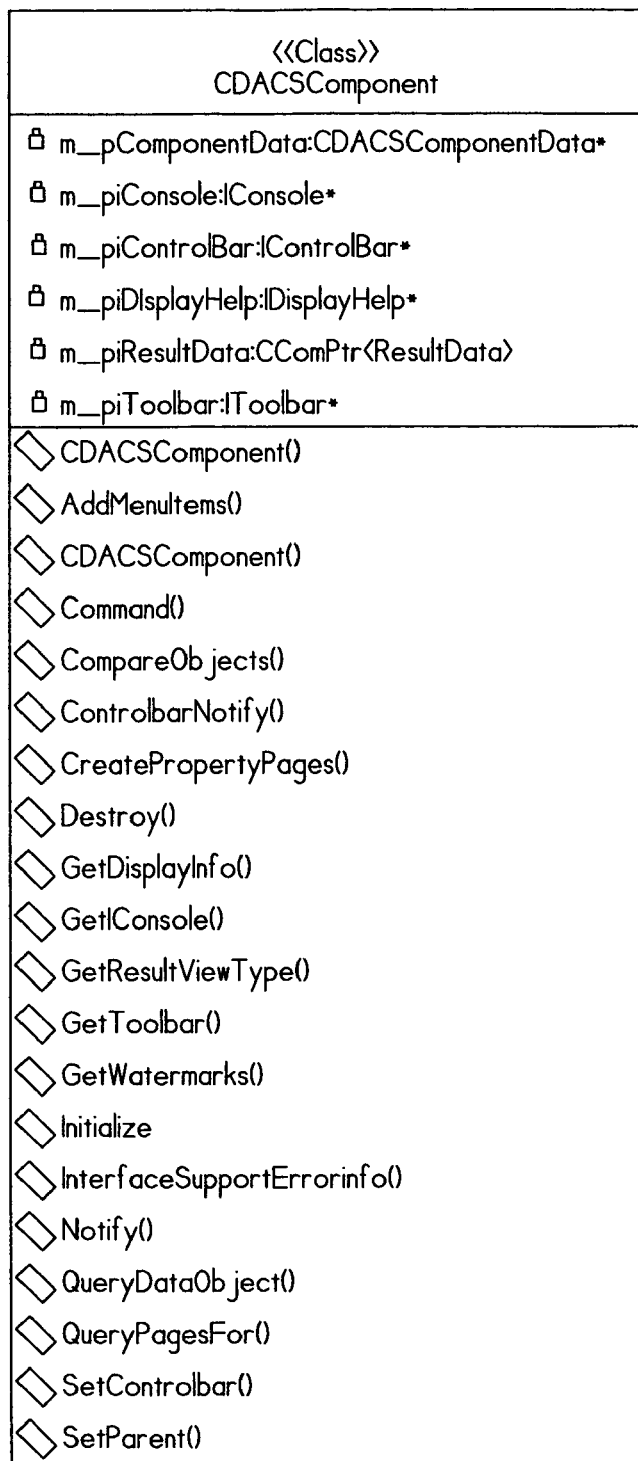
Figure 8A:
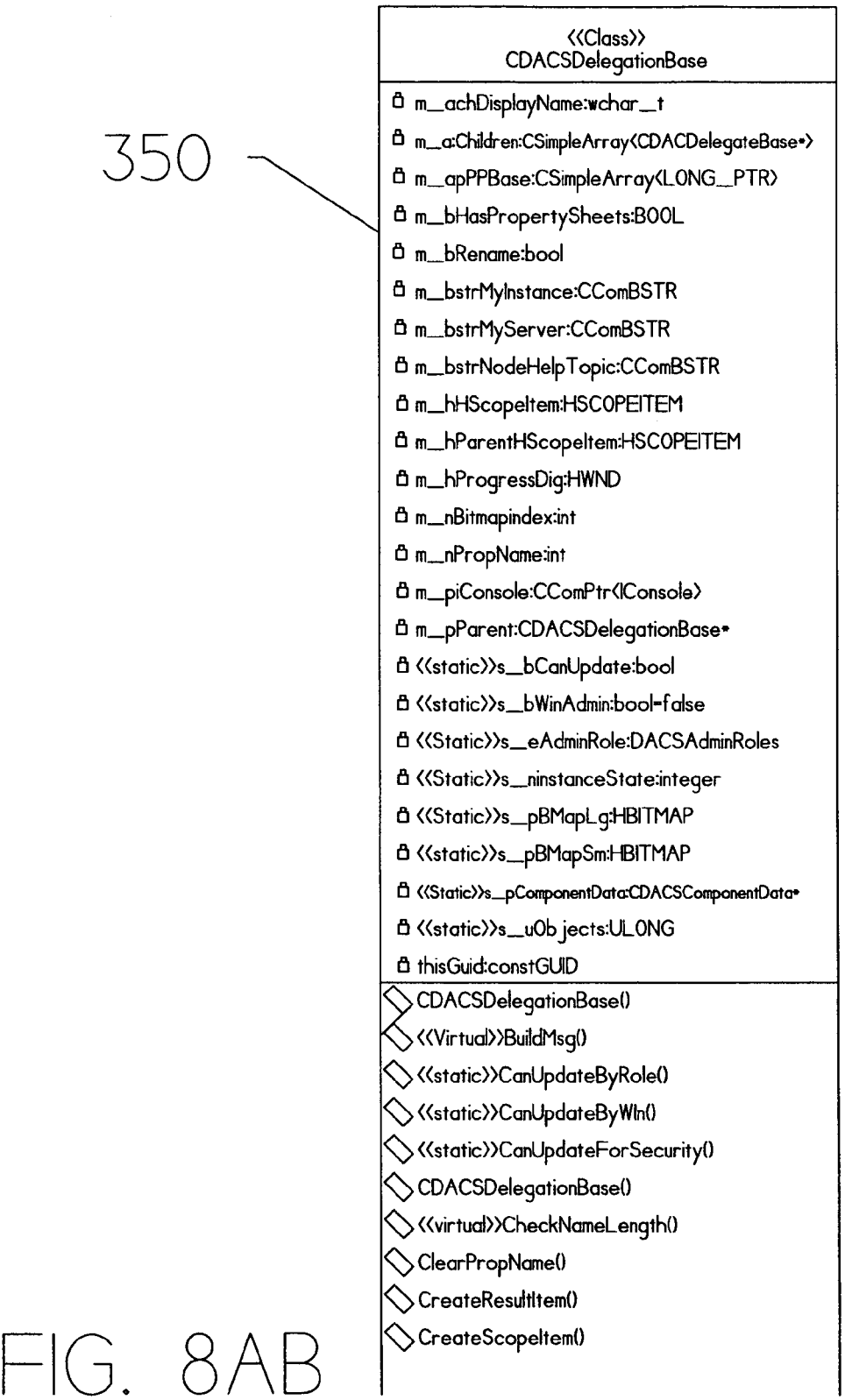
Figure 8B:
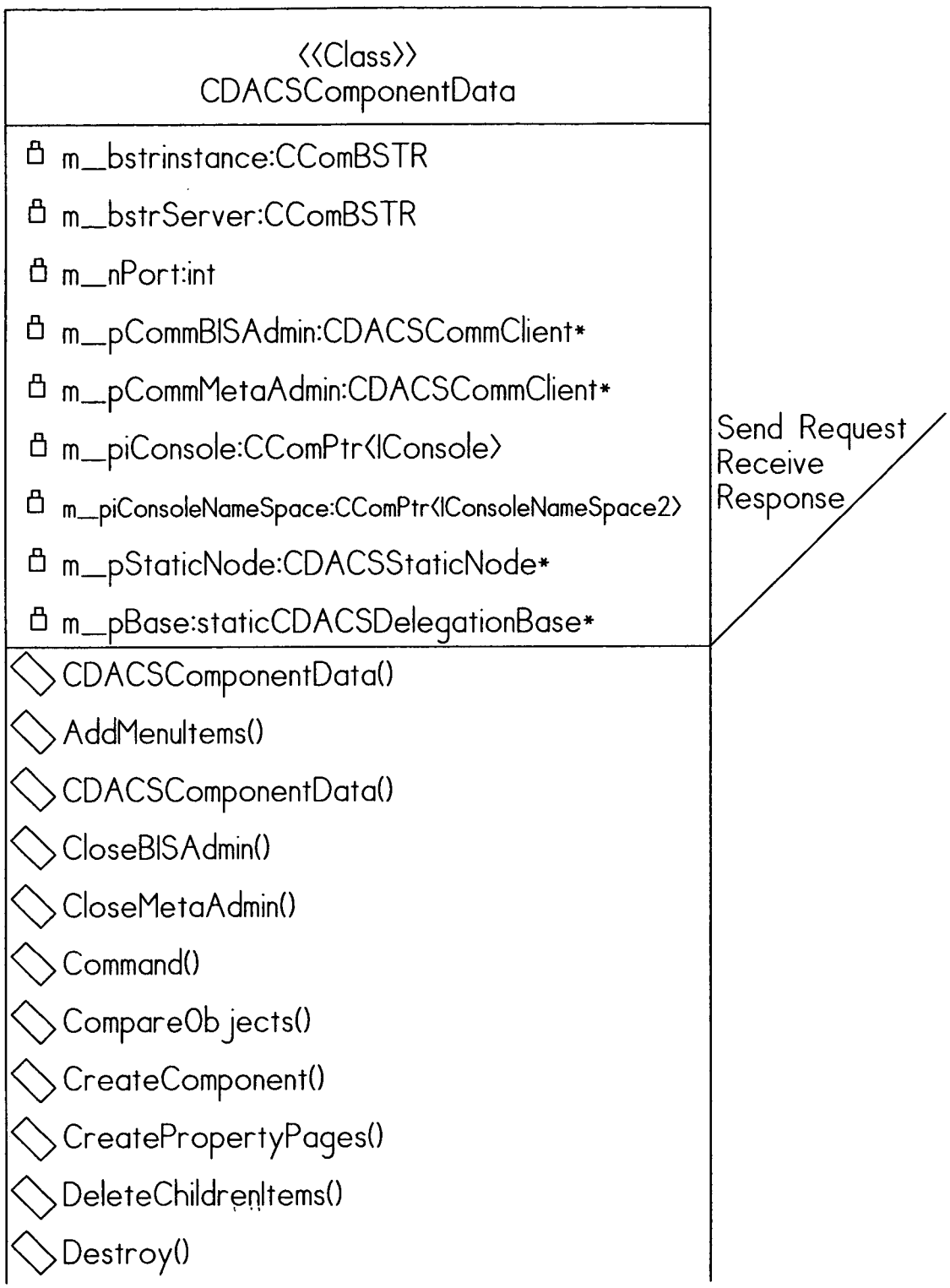
Figure 8B:
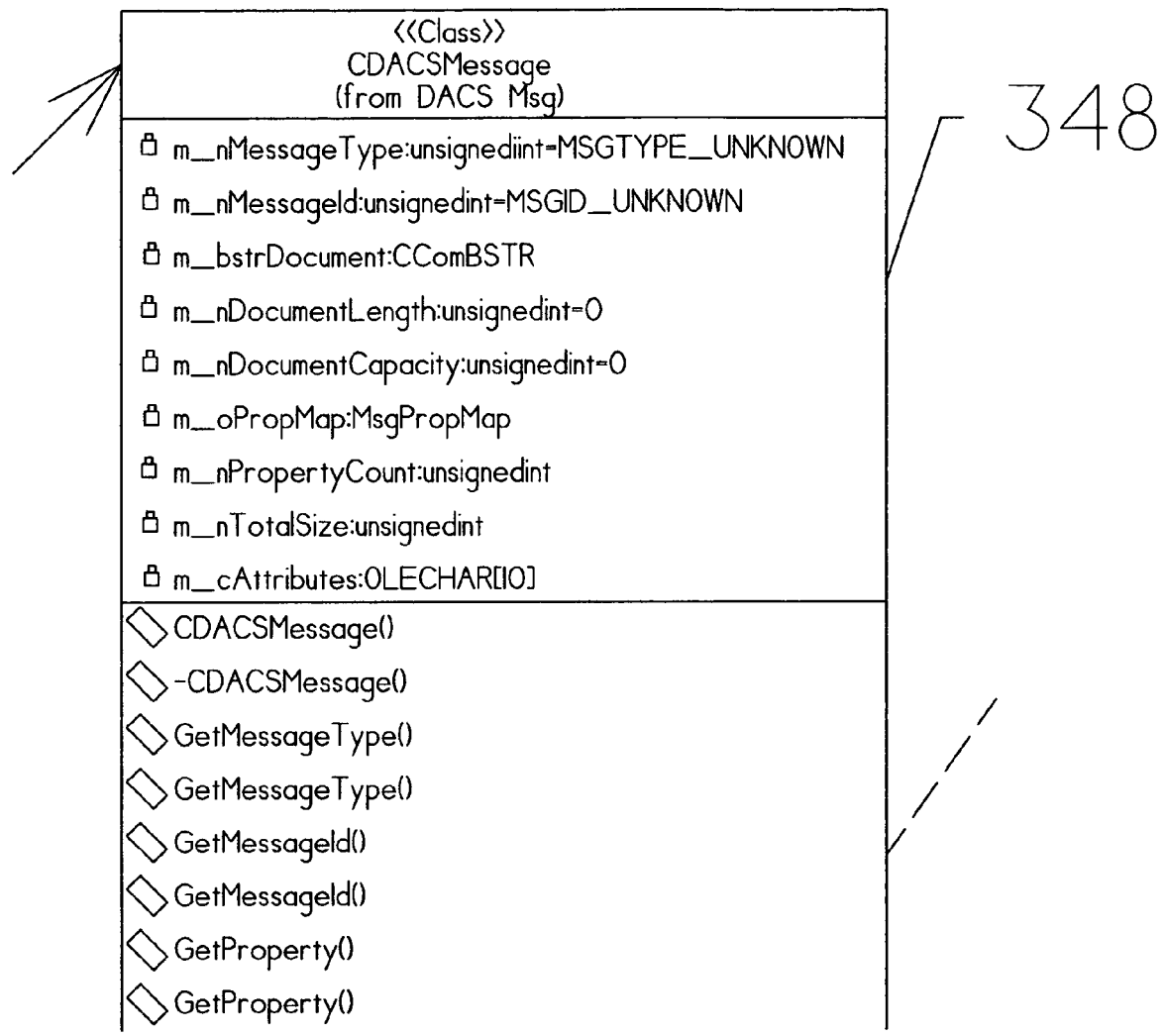

FIG. 8 is a detailed class diagram showing operation of the embodiment of FIG. 7 employing the Action Control List. CDACSActionControl 352 initializes CDACSDelegationBase 352. CDACSComponent 346 places a call to CDACSComponentData 346 to talk with the server. CDACSMessage 348 represents the request message and response.

FIG. 9 is a schematic diagram of the message flow, along with a table defining the specific message types. As previously explained, these messages are sequenced by the Action Control List 338 (see also FIG. 7).

Having thus described the preferred embodiments of the present invention, those of skill in the art will be readily able to adapt the teachings found herein to yet other embodiments within the scope of the claims hereto attached.

We claim:

1. A method of performing a compound service request by enhanced message handling techniques which provide sequencing of multiple messages between client and server applications within a computer based data base management system, comprising:
   a. predefining a sequence of multiple messages required to honor said compound service request within an Action Control List, the Action Control List being implemented as part of a client user interface application;
   b. initializing said Action Control List by an event handler, the event handler being implemented as part of the client user interface application;
   c. transferring said Action Control List from said event handler to an administrative object of said computer based data base management system, the administrative object being implemented as part of the client user interface application; and
   d. serially transferring said sequence of multiple messages from said administrative object to a server application under control of said Action Control List.

2. A method according to claim 1 further comprising a client application containing said event handler.

3. A method according to claim 2 wherein at least one of said sequence of messages evokes a response from said server application.

4. A method according to claim 3 wherein said serially transferring step further comprises transferring via a publicly accessible digital data communication network.

5. A method according to claim 4 wherein said publicly accessible digital data communication network further comprises an Internet.

6. An apparatus for enhanced message handling techniques which provide sequencing of multiple messages between client and server applications within a computer based data base management system, the server application being executed by a processor of a server in the computer based data base management system, comprising:
   a. a processor and memory providing an event handler implemented as part of a client application;
   b. an Action Control List prepared by said event handler, the Action Control List being implemented as part of the client application;
   c. an administrative object of said computer based data base management system responsively coupled to said Action Control List the administrative object being implemented as part of the client application; and
   d. a server application responsively coupled to said administrative object, and serially transferring a sequence of multiple messages from said administrative object to the server application under control of said Action Control List.

7. The apparatus of claim 6 wherein said Action Control List predefines a sequence of messages.

8. The apparatus of claim 7 further comprising a client application containing said event handler.

9. The apparatus of claim 8 further comprising a publicly accessible digital data communication network which responsively couples said administrative object to said server application.

10. The apparatus of claim 9 wherein said publicly accessible digital data communication network further comprises an Internet.

11. An apparatus for enhanced message handling techniques which provide sequencing of multiple messages between client and server applications within a computer based data base management system, the server application being executed by a processor of a server in the computer based data base management system, comprising:
   a. processor and memory providing an event handler adapted to present a service request, the event handler being implemented as part of a client application;
   b. a database management system including an Action Control List prepared by said event handler for defining a plurality of multiple messages associated with said service request, the Action Control List being implemented as part of the client application;
   c. a client application adapted to implement an administrative object of said computer based data base management system responsively coupled to said Action Control List for transferring said service request; and d. server application responsively coupled to said administrative object for honoring said service request, and serially transferring a sequence of multiple messages from said administrative object to the server application under control of said Action Control List.

12. An apparatus according to claim 11 wherein said Action Control List defines a plurality of messages in sequential order.

13. An apparatus according to claim 12 further comprising a publicly accessible digital data communication network responsively coupling said administrative object and said server application.

14. An apparatus according to claim 13 wherein said publicly accessible digital data communication network further comprises an Internet.

15. A data processing system having, an improvement for enhanced message handling techniques which provide sequencing of multiple messages between client and server applications within a computer based data base management system, the server application being executed by a processor of a server in the computer based data base management system, comprising:

a. a processor and memory providing an event handler implemented as part of a client application;

b. an Action Control List responsively coupled to and prepared by said event handler, the Action Control List being implemented as part of the client application;

c. an administrative object of said computer based data base management system responsively coupled to said Action Control List, the administrative object being implemented as part of the client application; and d. a server application responsively coupled to said administrative object, and serially transferring a sequence of multiple messages from said administrative object to the server application under control of said Action Control List.

16. The data processing system according to claim 15 further comprising a publicly accessible digital data communication network which responsively couples said administrative object to said server application.

17. The data processing system according to claim 16 wherein said publicly accessible digital data communication network further comprises an Internet.

18. The data processing system according to claim 17 further comprising a user terminal housing said event handler.

19. The data processing system according to claim 18 wherein said Action Control List defines a sequence of messages.

20. An apparatus for accessing a database by enhanced message handling techniques which provide sequencing of multiple messages between client and server applications within a computer based data base management system, the server application being executed by a processor of a server in the computer based data base management system, comprising:

a. a memory and processor executing a client application having an event handler;

b. an Action Control List which predefines a sequence of multiple messages prepared by said event handler required to honor a compound service request, the Action Control List being implemented as part of the client application;

c. an administrative object of said computer based data base management system responsively coupled to said Action Control List via a publicly accessible digital data communication network, the administrative object being implemented as part of the client application; and d. a server application responsively coupled to said administrative object, and serially transferring a sequence of multiple messages from said administrative object to the server application under control of said Action Control List.

* * * * *